United States Patent [19]

Markow

[11] Patent Number: 4,953,291
[45] Date of Patent: Sep. 4, 1990

[54] TIRE INTERIOR SUPPORT SYSTEM

[75] Inventor: Edward G. Markow, Oakdale, N.Y.

[73] Assignee: Grumman Aerospace Corporation, Bethpage, N.Y.

[21] Appl. No.: 281,714

[22] Filed: Dec. 9, 1988

[51] Int. Cl.⁵ .............................................. B60C 17/06
[52] U.S. Cl. .................................. 29/894.351; 152/158; 152/520
[58] Field of Search .............. 152/516, 517, 520, 522, 152/157, 158; 301/39 T; 29/159.1, 159.01, 894.351

[56] References Cited

U.S. PATENT DOCUMENTS

| | | |
|---|---|---|
| 939,638 | 11/1909 | Rowling . |
| 1,227,108 | 5/1917 | Boggs . |
| 3,250,310 | 5/1966 | Johnson . |
| 3,949,796 | 4/1976 | Bartos . |
| 4,008,743 | 2/1977 | Welch . |
| 4,081,014 | 3/1978 | Searle . |
| 4,137,960 | 2/1979 | Cataldo . |
| 4,257,467 | 3/1981 | Van der Burg . |
| 4,334,565 | 6/1982 | Stokes . |
| 4,341,249 | 7/1982 | Welter . |
| 4,371,023 | 2/1983 | Campagna . |
| 4,461,333 | 7/1984 | Filliol et al. . |
| 4,773,461 | 9/1988 | Landers et al. ...................... 152/520 |

Primary Examiner—Michael W. Ball
Assistant Examiner—Geoffrey L. Knable
Attorney, Agent, or Firm—Pollock, VandeSande & Priddy

[57] ABSTRACT

A circular insert is located within a tire and is adapted to contact the interior surface of the tire side walls when the tire becomes deflated. The insert is positionally interposed within the folds of a bulging side wall during deflation and transmits load between the side wall and a tire rim to prevent complete collapse of the run-flat tire.

4 Claims, 1 Drawing Sheet

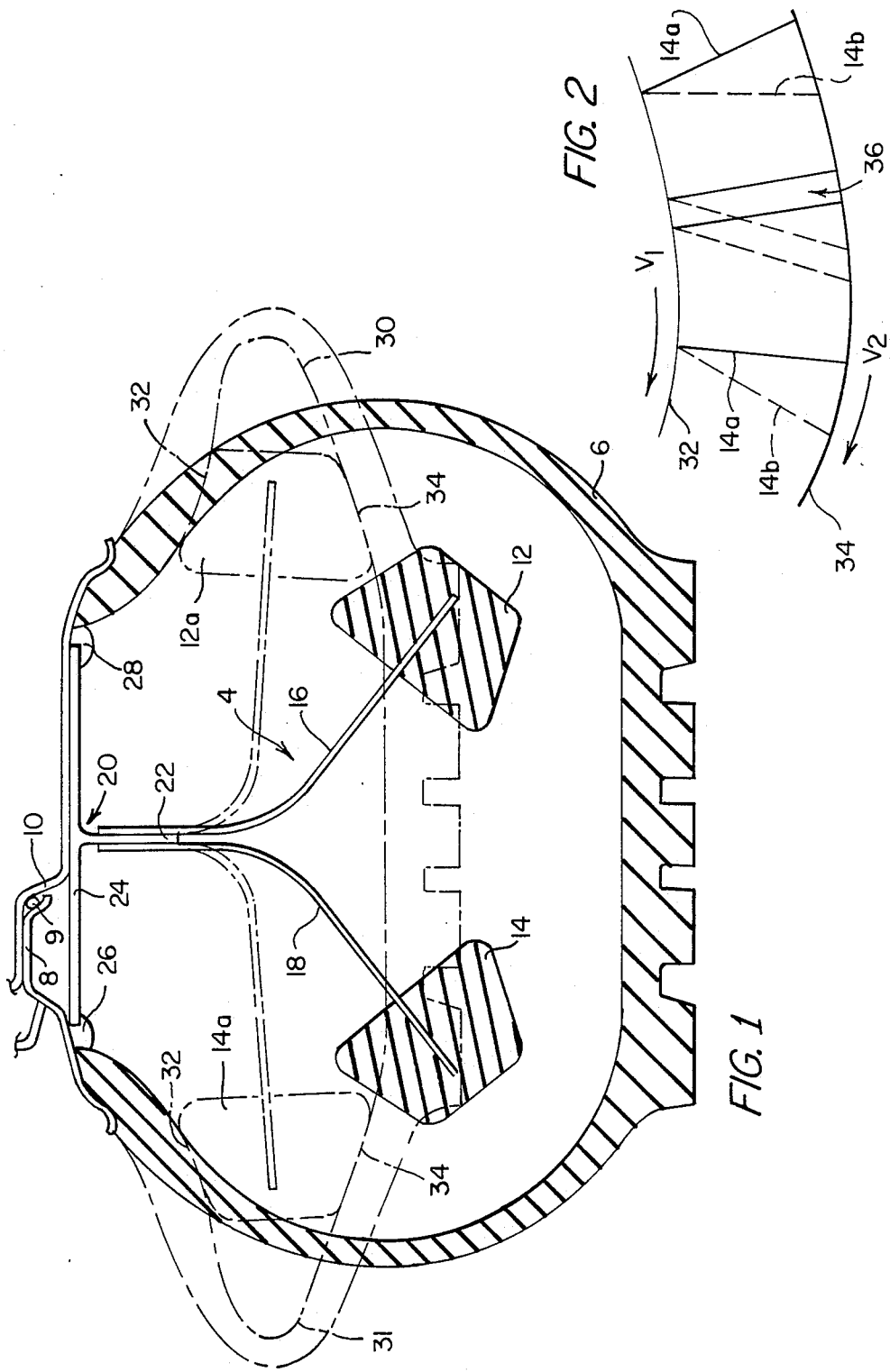

TIRE INTERIOR SUPPORT SYSTEM

FIELD OF THE INVENTION

The present invention relates to tubeless tire augmentation devices, and more particularly to an interior support system for preventing the complete collapse of a deflated vehicle tire.

BRIEF DESCRIPTION OF THE PRIOR ART

A number of devices have been designed to support the interior of a tubeless tire in the event it becomes deflated so that complete collapse of the tire may be prevented. One example of such a device used in a run-flat tire is disclosed in U.S. Pat. No. 4,257,467 to Van der Burg. The tire disclosed in the patent includes an inflatable toroidal inner tube and separate non-inflatable toroidal support element which cooperate to prevent the collapse of the tire when it is punctured or deflated. However, the load supporting elements in contact with only the footprint area of the tire support the full wheel load, as opposed to a distribution of the load along the entire internal device. As a result inferior performance and wear are to be anticipated.

Another example of a toroidal insert for a tubeless tire is illustrated in U.S. Pat. No. 4,334,565 to Stokes. This reference teaches an elastomeric insert to support the load at deflated deflections. A deflated tire has its casing protected from complete collapse by the inner position of an elastomeric mass from the insert. However, in this condition the ride behavior of a tire is similar to that of a seriously deflated tire; and vehicle operation during this condition may be unacceptable.

BRIEF DESCRIPTION OF THE INVENTION

The present invention avoids the problems of the discussed prior art by offering an insert structure which has frusto-conical support structures bounded by rubber edges which contact the side walls of the tire and are adapted to distribute tire load in the event of deflation. Further, the insert of the present invention is segmented so that individual segments are capable of deflecting to accommodate "creep" between different areas of contact between the tire side walls and the insert. This prevents the build-up of frictional heat which would destroy the tire if operated in a deflated mode.

Further, the present insert includes an elastic disc portion which provides a softer and more dynamically acceptable support when riding in a run-flat condition as well as during impact or transient overload of the tire.

BRIEF DESCRIPTION OF THE FIGURES

The above-mentioned objects and advantages of the present invention will be more clearly understood when considered in conjunction with the accompanying drawings, in which:

FIG. 1 is a partial sectional view of a tubeless tire equipped with the present invention;

FIG. 2 is a diagrammatic illustration illustrating the segmented nature of the present insert as well as the deflection characteristics thereof.

DETAILED DESCRIPTION OF THE INVENTION

FIG. 1 illustrates a partial sectional view of a tire with the present insert 4 located within the interior of the tire. From an overview of FIG. 1, it will be seen that elastomeric members 12 and 14 shown in solid lines are normally disengaged from the interior surface of the tire side wall when the tire is normally inflated.

However, when the tire becomes deflated, as shown by dotted lines, the elastomeric members 12 and 14 swing upwardly into engagement with interior surfaces of side wall folds 30 and 31. In this interposed position the engaged elastomeric members 12a and 14a transmit wheel load to a tire rim, thereby preventing complete collapse of the tire.

Now turning to the details of the structure shown in FIG. 1, a conventional radial tire 6 is illustrated as being mounted on a two-part rim 8 and 10, commonly used in heavy-duty military vehicles An O-ring 9 is interposed between the two-part rim 8 and 10 to maintain tire pressure.

Each of the members 12 and 14 normally faces an opposite side of the tire crown and the members are supported by flexible discs correspondingly numbered 16 and 18, which may be fabricated from high strength elastic steel or non-metallic structural composite materials. Each of the elastomeric members 12 and 14 and their respective discs 16 and 18 are continuous through the toroidal interior volume of the tire; and each disc forms a frusto-conical geometric figure extending symmetrically radially outwardly and in an opposite axial direction relative to the other disc having a horizontal axis. Each member is circular having a trapezoidal cross-section. In actuality, each of the elastomeric members 12 and 14 and corresponding discs 16 and 18 are slotted, as will be explained hereinafter.

The radially inward sections of the discs 16 and 18 are secured to a sandwiched web 22 of a bracket generally indicated by reference numeral 20. The cross flange 24 of the bracket is welded (26, 28) or otherwise suitably attached to the two-part rim 8 and 10.

With the insert 4 so secured to the rim sections 8 and 10, the elastomeric members 12 and 14 normally maintain a spaced relationship with the interior surface of the tire 6.

When the tire looses sufficient inflation, it begins to collapse as indicated by dotted lines. The side wall of the tire generates outwardly extending side wall folds 30 and 31 which receive respective elastomeric members 12 and 14 due to their displacement into the folds under the urging of the interior surface of the tire crown.

For the position of elastomeric members in the folds 30 and 31, as indicated by reference numerals 12a and 14a, road forces are transferred from the tire 6 to the rim sections 8 and 10, via the insert 4, thereby preventing total collapse of the tire. Due to contact between the interior tire side wall surface and the elastomeric members, a deflated tire is still capable of performing quite satisfactorily, even in response to transient impact loading.

A problem would arise if the elastomeric members 12 and 14 were allowed to simply rest against the interior surface of the folds 30 and 31. This is due to the fact that the elastomeric member-side wall contact areas 32 and 34 experience non-identical differential velocities which would cause rubbing or scuffing in the contact areas. This would generate heat which could ultimately destroy the tire rubber in the contact areas and further worsen the disabled condition of the tire. One solution for this problem would be the introduction of a lubricant within the tire. However, this adds unnecessary mass to the tire and would also create a maintenance problem wherein periodic checking of the tire interior would become necessary to ensure that sufficient lubricant is present.

FIG. 2 illustrates a solution presented by the present invention which avoids the use of lubrication to prevent scuffing and heat generation when the elastomeric members are engaged within the folds 30 and 31. FIG. 2 is a diagrammatic illustration of two adjacent segments of elastomeric member 14a, shown in solid lines, engaged between contact areas 32 and 34. As will be seen, slots 36 are formed within the elastomeric member 14a so that the result is a segmented elastomeric member illustrated in solid lines. However, when differential velocities $V_1$ and $V_2$ along contact areas 32 and 34 would normally cause rubbing and scuffing against the elastomeric members, the fact that they are segmented allows deflection of individual elastomeric member segments as indicated in dotted lines by reference numeral 14b. In other words, the segmentation of the elastomeric member allows sufficient shear strain displacement in the contact area to prevent heat-generating scuffing or rubbing.

The insert of the present invention is envisioned as being fabricated in multiple sections which may be sector shaped. This will facilitate the insertion, assembly and disassembly of the insert, past the bead of the tire and into the interior. Various sections may be mechanically fastened together once inside the tire.

Accordingly, the design of the present invention offers an augmentation device, in the form of an insert, which permits a normal radial tire to be employed as a run-flat tire when the tire is in a deflated condition.

It should be understood that the invention is not limited to the exact details of construction shown and described herein for obvious modifications will occur to persons skilled in the art.

I claim:

1. An insert for use in a tire and allowing a tire to operate in a run-flat condition, the insert comprising:
   means for attaching the insert to a tire rim;
   a pair of flexible annular contoured discs connected to the attaching means and extending radially and axially outwardly therefrom in opposite axial directions such that each disc forms a frusto-conical geometric figure; and
   a circular elastomeric member attached to the outer periphery of each disc, the member being in normally non-contacting relation with the tire interior surface when installed within the tire, each member having a generally trapezoidal cross-section;
   the discs having sufficient flexibility for deflecting correspondingly attached elastomeric members into respective bulging folds of a deflected tire side wall thereby preventing collapse of the tire.

2. The structure set forth in claim 1 wherein each elastomeric member is slotted radially with respect to the rim to produce elastomeric member segments capable of deflection sufficient to withstand shear strain in contact areas existing between the tire and elastomeric member.

3. A method for enhancing a tire for run-flat operation and comprising the steps:
   positioning two continuous flexible discs within the interior of the tire;
   securing a circular elastomeric member to an outer peripheral edge of each disc;
   orienting the elastomeric members toward opposite sides of the crown of the tire in normally non-contacting relation when the tire is inflated;
   attaching a radially inward peripheral edge of each disc to a wheel rim thereby providing a structure for transferring load forces from the tire to the rim;
   wherein tire collapse is prevented by displacement of the elastomeric members into interposed relation with interior side wall areas constituting bulging folds which develop upon tire deflation.

4. The method set forth in claim 3 together with the step of forming radial slots along the circumference of the members to produce elastomeric member segments capable of deflection sufficient to withstand shear strain in contact areas existing between the tire and elastomeric member.

* * * * *